(12) United States Patent
Horacek et al.

(10) Patent No.: US 6,340,645 B1
(45) Date of Patent: Jan. 22, 2002

(54) INTUMESCENT LAMINATES WITH HIGH HEAT TRANSFER RESISTANCE

(75) Inventors: Heinz Horacek, Linz; Stefan Pieh, Leonding, both of (AT)

(73) Assignee: DSM Fine Chemicals Austria Nfg GmbH & CoKG, Linz (AT)

(*) Notice: Subject to any disclaimer, the term of this patent is extended or adjusted under 35 U.S.C. 154(b) by 0 days.

(21) Appl. No.: 09/389,062

(22) Filed: Sep. 2, 1999

(30) Foreign Application Priority Data

Sep. 4, 1998 (AT) .............................................. 1501/98

(51) Int. Cl.⁷ .......................... B32B 27/04; B32B 27/12; B32B 27/24
(52) U.S. Cl. ....................... 442/138; 442/136; 442/141; 442/143; 442/147; 442/180; 428/920; 428/921
(58) Field of Search ................................. 442/136, 138, 442/141, 143, 180, 147; 428/920, 921, 364, 365

(56) References Cited

U.S. PATENT DOCUMENTS

| 3,915,777 A | 10/1975 | Kaplan |
| 4,442,157 A | 4/1984 | Marx et al. |
| 4,965,296 A | * 10/1990 | Hastings ..................... 523/179 |
| 6,000,189 A | * 12/1999 | Breuer et al. .............. 52/649.1 |

FOREIGN PATENT DOCUMENTS

WO    WO93/11196    6/1993

* cited by examiner

*Primary Examiner*—Terrel Morris
*Assistant Examiner*—Ula C. Ruddock
(74) *Attorney, Agent, or Firm*—Wenderoth, Lind & Ponack, LLP

(57) ABSTRACT

Intumescent laminate with high heat transfer resistance composed of a glass-fiber web or glass-fiber fabric each of which has been coated with a four-component intumescent composition comprising a) a phosphate compound, b) a melamine compound, c) a polyol and d) an inorganic framework-forming compound.

6 Claims, No Drawings

INTUMESCENT LAMINATES WITH HIGH HEAT TRANSFER RESISTANCE

Intumescent materials in the form of paints, lacquers, coatings, pastes, putties, mortars, seals, boards, blanks or cut sections, strips, foams, webs, films, profiles and other semi-finished products are used for fire protection in buildings. When intumescent materials are exposed to heat they expand and form an insulating flame-retardant foam which protects underlying surfaces and substances from exposure to the fire.

The classic three-part mixture is composed of substances contributing carbon, dehydrators and blowing agents (expanders).

DE 27 03 022, DE 28 17 268, DE 28 27 828, U.S. Pat. No. 4,375,516 or DE 30 42 788, for example, disclose porous backing materials coated with intumescent compositions.

All of the patent applications cited describe layer materials, such as boards, films or webs, with a sealed surface which is intrinsically unsuitable for certain sectors, such as sound insulation or fire-protection bulkheads of open conduits.

It was also apparent that, although a wide variety of intumescent materials is available in the market, it is not yet possible to achieve satisfactory impregnation of microporous backing materials.

Since in many potential application sectors it is impossible to exclude the formation of condensation, the only impregnating agents which can be used are those which form compounds insoluble, or at least nearly insoluble, in water. The selection is therefore restricted to a few fire-protection paints and fire-protection lacquers which form water-resistant films on drying.

However, experiments to saturate mineral-fiber boards or microporous melamine-resin foams with water-resistant fire-protection paints gave no industrially useful results. The pulverulent fire-protection components became concentrated at the surface of the backing materials, and only the binder diffused into the interior of the backing boards. The adhesion of the fire-protection components was only slight and they crumbled away on drying.

The obvious use of non-pigmented fire-protection lacquers also failed to achieve any substantial improvement. These high-viscosity formulations cannot be used to saturate microporous backing materials. Thorough saturation of the backing materials was achieved only after appropriate dilution. However, the proportions introduced of the fire-protection components were too low for favorable results to be achieved in subsequent fire tests after drying.

It was an object of the present invention to provide flexible laminates having a high degree of expansion and high heat transfer resistance but not having the abovementioned disadvantages.

Surprisingly, the object was achieved by means of a laminate made from a glass backing material and a four-component layer.

The invention therefore provides an intumescent laminate with high heat transfer resistance, which is composed of a glass-fiber web or glass-fiber fabric coated with a four-component intumescent composition comprising a) a phosphate compound
b) a melamine compound
c) a polyol
and
d) an inorganic framework-forming compound.

The novel laminate has a coating made from four components. For the purposes of the invention, phosphate compounds (component a) are compounds selected from the class consisting of ammonium polyphosphate, melamine resin phosphate, polyol phosphates, such as, for example pentaerythritol phosphate, glycerol phosphate, sorbitol phosphate, mannitol phosphate, dulcitol phosphate, neopentyl glycol phosphate, ethylene glycol phosphate, dipentaerythritol phosphate, etc. For the purposes of the invention, melamine resin phosphates are compounds such as the reaction products of Lamelite C with phosphoric acid.

Preferred phosphate compounds are polyol phosphates and ammonium polyol phosphates.

Component b) is a melamine compound selected from the class consisting of melamine, hexamethoxymethylmelamine (HMMM), dimelamine pyrophosphate, melamine polyphosphate and melamine phosphate. Preference is given to HMMM or melamine.

Suitable polyols (component c) are those selected from the class consisting of sugars, pentaerythritol, dipentaerythritol, polyvinyl acetate, polyvinyl alcohol, sorbitol and EO-PO polyols. Preference is given to pentaerythritol, dipentaerythritol or polyvinyl acetate.

The fourth component, d), is an inorganic framework-forming compound selected from the class consisting of titanium dioxide, aluminum silicate, clay, zinc borate, calcium borate, sodium phosphate, sodium silicate, zeolite, wollastonite, boron phosphate, serpentine, kaolin, talc, sepiolite, alkaline earth and plagioclases, such as albite and anorthite.

Preference is given to titanium dioxide or aluminum silicate.

The amount of component a) used here is from 5 to 50% by weight, preferably from 10 to 30% by weight. The proportion of component b) is also from 5 to 50% by weight, preferably from 5 to 30% by weight.

The amount of component c) added is from 5 to 40% by weight, preferably from 10 to 30% by weight, and the amount of component d) used is from 5 to 30% by weight, preferably from 5 to 20% by weight.

There is a proviso that all of the components a) to d) always total to 100% by weight.

In each case here, it is possible to use only one compound per component, but it is also possible, for one or more of the components, to use two or more of the listed compounds.

In a specific embodiment, phosphate compound, component a), and polyol, component c), may be present in combination. In this case polyol partial phosphates are present as combined components a)+c).

For the purposes of the invention, polyol partial phosphates are compounds obtained, for example, by esterifying polyols with phosphoric acid or polyphosphoric acids. Examples of these are combination products made from phosphoric acid, ethylene glycol and pentaerythritol.

The four-component composition may, if desired, comprise conventional auxiliaries, such as wetting agents, antifoams, thickeners, dyes, fungicides, plasticizers, binders, flame retardants or various fillers.

The proportion of the individual additives is in each case from 0 to 10% by weight, preferably from 0.1 to 6% by weight. It is again important here that all of the constituents do not give more than 100% by weight in total.

Examples of suitable auxiliaries are conventional wetting agents based on polyacrylates and/or on polyphosphates, alginate thickeners, silicone antifoams; binders, such as polyvinyl acetates, polyvinyl alcohols, polyvinyl butyrals and polyvinyl chloride, styrene-acrylate, vinyltoluene-acetate, etc.; plasticizers, such as chlorine-containing waxes, fillers, such as vermiculite, inorganic fibers, quartz sand, glass microspheres, mica, silica, mineral wool, etc.; flame retardants, such as phosphoric esters, Hostaflam TPOP 920 (Clariant), Amgard V 490 (Albright+Wilson), triethyl phosphate, tris(chloropropyl) phosphate etc.

The coating is applied in the form of a solution or paste to the backing, and, if desired, an amount of from 10 to 50% by weight, preferably from 15 to 45% by weight, of water is added to the mixture of components, again with the proviso that all of the components should not give more than 100% by weight in total.

The backing used for the novel laminate is a glass-fiber web or a glass-fiber fabric. The weight per unit area of the backing is preferably from 50 to 500 g/m².

The coating process is carried out on a horizontal spreading and coating (or drying) unit.

The temperature during the coating procedure is from about 10 to 30° C., and the drying temperature is from about 70 to 170° C.

According to the invention, preferred laminates have a thickness of from 0.5 to 15 mm. The preferred overall thickness of the laminate is from 1 to 5 mm.

The novel laminates feature high heat transfer resistance. This value is above 0.3 Km²/W at 800° C. The laminates also feature a high expansion factor. For example, at 300° C. this factor is mostly above 20. The novel laminates are therefore suitable, for example, as a hot-gas seal for fire doors, as fire-protection curtaining for apertures in masonry walls, as door panels [lacuna] as windings surrounding individual cables or cable runs, etc.

EXAMPLES 1–4

The individual components of the appropriate intumescent compositions were mixed homogeneously on a Molteni mixer with planetary stirrer. The finished pastes were then applied and dried on a horizontal spreading and drying unit. The drying temperature was from 70 to 120° C.

The compositions of the individual mixtures are given in the tables below.

Example 1

| Starting material | % by weight | Brand name/company | Group |
|---|---|---|---|
| H₂O | 25.6 | | |
| Melamine 200 mesh | 5.6 | DSM | b |
| Dipenta-erythritol | 2.8 | Degussa | c |
| Ammonium polyphosphate | 17.0 | Exolith 422/Hoechst | a |
| Titanium dioxide | 5.6 | Kronos | d |
| Propylene glycol | 2.3 | Dow | |
| Quartz sand | 4.6 | 2E23/Quarzwerke | d |
| Polyvinyl acetate (PVA) | 28.5 | Mowilith DM 230/Hoechst | c |
| Mineral fiber | 4.6 | Inorphil 060/Langer | |
| Phosphoric ester | 3.4 | Hostaflam TPOP 920/Hoechst | a |
| Σ | 100 | | |

Drying temperature: 110° C.

Example 2

| Starting material | % by weight | Brand name/company | Group |
|---|---|---|---|
| Water | 15.8 | | |
| PVA | 22 | Vinnapas EV 25% strength/Wacker | c |
| Antifoam | 1 | Terric-X40 L/ICI | |
| Fungicide | 0.4 | Acticide EP/Thor | |
| Antifoam | 0.4 | Foammaster VL/Henkel | |
| TiO₂ | 9 | Kronos 2190/Kronos | d |
| Dipenta-erythritol | 10 | Dipenta/Degussa | c |
| Melamine | 12.8 | BASF | b |
| Chlorowax | 3.8 | Hordaflex CL50/Hoechst | |
| Ammonium polyphosphate | 24 | Hostaflam AP 422/Hoechst | a |
| Fibers | 0.8 | Acrysol ASE60/Nestle & Co | |
| Σ | 100 | | |

Example 3

| Starting material | % by weight | Brand name/company | Group |
|---|---|---|---|
| K 30 | 25 | DSM Chemie Linz | a + c |
| HMMM | 25 | U100/DSM Chemie Linz | b |
| Glass microspheres (3000) | 9.1 | CP3/Potters Ballotini | |
| Mineral wool | 9.1 | Inorphil 020/Langer | |
| Mica | 9.1 | Vermex SF/Vermica | d |
| TiO₂ | 9.1 | Kronos | d |
| PVA | 13.6 | Mowilith DM 230 | c |
| Σ | 100 | | |

K30: Reaction product of ethylene glycol, pentaerythritol and phosphoric acid.

Example 4

| Starting material | % by weight | Brand name/company | Group |
|---|---|---|---|
| H₂O | 22.4 | | |
| Polysaccharide | 0.2 | Deuteron SR 28 | |
| Ammonium polyphosphate | 22 | Hostaflam AP 422/Hoechst | a |
| Melamine (ground) | 11 | DSM | b |
| TiO₂ | 10 | Kronos | d |
| Pentaerythritol | 10 | Pentaerythritol F 200/Degussa | c |
| Propylene glycol | 2.0 | DOW | |
| Benzisothiazolone | 0.1 | Mergal K11 | |
| Silica | 8.0 | EFA filler | d |
| Hexamethylene-tetramine | 1.0 | — | |
| Polyethylene fibers | 0.5 | Hostapulp FPE 930T/Hoechst | |
| PVA dispersion | 12.0 | Vinnapas EV 25/Wacker | d |
| Antifoam | 0.8 | Dehydran 1293 | |
| Σ | 100 | | |

The results of testing on the finished laminates can be seen in the following table:

|  | Ex 1 Web | Fabric | Ex 2 Web | Ex 3 Web | Ex 4 Web |
|---|---|---|---|---|---|
| Color | White | White | off-white | white | Natural |
| Consistency | Solid | Solid | Solid | Solid | Solid |
| Weight per unit area | 0.8 kg/m$^2$ | 0.95 kg/m$^2$ | 1.46 kg/m$^2$ | 2.09 kg/m$^2$ | 1.18 kg/m$^2$ |
| Layer thickness | 1.04 mm | 0.82 mm | 1.13 mm | 1.85 mm | 1.15 mm |
| Density | 0.82 g/cm$^3$ | 1.15 g/cm$^3$ | 1.29 g/cm$^3$ | 1.13 g/cm$^3$ | 1.03 g/cm$^3$ |
| Exp. H. | 22 mm | 13 mm | 26 mm | 50 mm | 24 mm |
| Exp. F. | 1:21 | 1:16 | 1:23 | 1:27 | 1:21 |
| Flexibility Mandrel flex test |  |  |  |  |  |
| 75 mm | Acc. | Acc. | Acc. | Acc. | Acc. |
| 50 mm | Acc. | Acc. | Acc. | Acc. | Fracture |
| 25 mm | Acc. | Acc. | Acc. | Acc. | Fracture |
| Ash |  |  |  |  |  |
| (450°, 15 min) | 59% | 77% | 51% | 69% | 60% |
| (1000°, 15 min) | 49% | 68% | 36% | 55% | 45% |
| Fire performance | B1 | B1 | B1 | B1 | B1 |
| Residual moisture | 3.05% | 1.98% | 0.98% | 0.90% | 1.03% |
| Moisture absorption | 15% | 30% | 49% | 37% | 27% |
| Heat transfer resistance (K.m$^2$/W) | 0.40 | 0.30 | 0.42 | 0.45 | 0.40 |

Exp. H. Expansion height, unloaded, 450° C., 15 min
Exp. F. Expansion factor=Expansion height/layer thickness
Acc. Acceptable Moisture absorption: direct storage in water for 20 h Web: Microlith PM 10/2 (Schuller)

Fabric: E420 876/100 (Vertex)

What is claimed is:

1. An intumescent laminate with high heat transfer resistance, which is composed of a glass-fiber web or glass-fiber fabric coated with a three-component intumescent composition comprising
   a) a polyol partial phosphate
   b) a melamine compound and
   c) an inorganic framework-forming compound.

2. The intumescent laminate as claimed in claim 1, wherein the amounts used are from 5 to 50% by weight of component a), from 5 to 50% by weight of component b), and from 5 to 30% by weight of component c), with the proviso that all of the components together give 100% by weight.

3. The intumescent laminate as claimed in claim 1, wherein component a) is a reaction product made from phosphoric acid, ethylene glycol and pentaerythritol.

4. The intumescent laminate as claimed in claim 1, wherein component b) is a melamine compound selected from the group consisting of melamine, hexamethoxymethyl-melamine, dimelamine pyrophosphate, melamine polyphosphate and melamine phosphate.

5. The intumescent laminate as claimed in claim 1, wherein component c) is an inorganic framework-forming compound from the group consisting of titanium dioxide, aluminum silicate, clay, zinc borate, calcium borate, sodium phosphate, sodium silicate, zeolite, wollastonite, boron phosphate, serpentine, kaolin, talc, sepiolite, alkaline earth and plagioclases.

6. The intumescent laminate according to claim 1, wherein the inorganic framework-forming compound is albite or anorthite.

* * * * *